United States Patent
Jaradi et al.

(10) Patent No.: US 10,405,613 B2
(45) Date of Patent: Sep. 10, 2019

(54) EXTENDABLE TWO-PIECE SEATBELT TONGUE

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US); Robert W. McCoy, Ann Arbor, MI (US)

(73) Assignee: FORD GLOBAL TECHNOLOGIES, LLC., Dearborn, MI (US)

( * ) Notice: Subject to any disclaimer, the term of this patent is extended or adjusted under 35 U.S.C. 154(b) by 0 days.

(21) Appl. No.: 15/854,171

(22) Filed: Dec. 26, 2017

(65) Prior Publication Data

US 2019/0191826 A1     Jun. 27, 2019

(51) Int. Cl.
    *B60R 22/12*        (2006.01)
    *B60R 22/28*        (2006.01)
    *A44B 11/25*        (2006.01)
    *B60R 22/18*        (2006.01)

(52) U.S. Cl.
    CPC ...... *A44B 11/2561* (2013.01); *A44B 11/2549* (2013.01); *A44B 11/2569* (2013.01); *B60R 2022/1806* (2013.01); *B60R 2022/281* (2013.01); *B60R 2022/286* (2013.01)

(58) Field of Classification Search
    CPC ............. A44B 11/2561; Y10T 24/4084; Y10T 24/4086; Y10T 24/4093; B60R 2022/286; B60R 2022/281; B60R 2022/1806

USPC .......................... 297/468, 469, 470, 471, 472
See application file for complete search history.

(56) References Cited

U.S. PATENT DOCUMENTS

| | | | | |
|---|---|---|---|---|
| 3,938,627 | A | * | 2/1976 | Nagazumi ............... B60R 22/28 297/472 X |
| 4,111,459 | A | * | 9/1978 | Magyar ................... B60R 22/18 297/468 X |
| 4,239,260 | A | * | 12/1980 | Hollowell ............... B60R 22/26 297/472 X |
| 4,245,376 | A | * | 1/1981 | Lassche ............. A44B 11/2515 297/468 X |
| 4,424,509 | A | * | 1/1984 | Andres ................. B60R 22/185 116/203 |
| 4,469,352 | A | * | 9/1984 | Korner .................. B60R 22/201 280/801.2 |

(Continued)

FOREIGN PATENT DOCUMENTS

| | | |
|---|---|---|
| CN | 203543890 U | 4/2014 |
| CN | 203709388 U | 7/2014 |

(Continued)

*Primary Examiner* — Rodney B White
(74) *Attorney, Agent, or Firm* — Frank A. MacKenzie; Bejin Bieneman PLC (57) ABSTRACT

A seatbelt tongue includes a tongue plate, a latch plate, a guide pin and a first retention bump. The tongue plate includes a belt slot. The latch plate is slidably connected with the tongue plate and is translatable between a first position and a second position. The guide pin is fixed to one of the tongue plate and the latch plate. The guide pin slidably passes through a pin slot in the other of the tongue plate and the latch plate. The first retention bump in the pin slot defines a pin pocket receiving the pin in the first position.

18 Claims, 7 Drawing Sheets

(56) References Cited

U.S. PATENT DOCUMENTS

| | | | | |
|---|---|---|---|---|
| 4,720,147 A * | 1/1988 | Takada | B60R 22/203 | 297/472 X |
| 4,790,597 A * | 12/1988 | Bauer | B60R 22/26 | 297/468 X |
| 4,886,296 A * | 12/1989 | Brodmann | B60R 22/28 | 280/805 |
| 4,938,914 A * | 7/1990 | Escaravage | B60R 22/201 | 280/801.2 |
| 5,149,136 A * | 9/1992 | Maekawa | B60R 22/202 | 280/801.2 |
| 5,286,058 A * | 2/1994 | Wier | B60R 22/06 | 297/471 X |
| 5,471,717 A | 12/1995 | Ennerdal et al. | | |
| 5,732,974 A * | 3/1998 | Sayles | B60R 22/18 | 297/470 X |
| 6,056,320 A * | 5/2000 | Khalifa | B60R 22/28 | 280/805 |
| 6,615,461 B2 * | 9/2003 | Suyama | A44B 11/2561 | 297/468 X |
| 6,913,288 B2 * | 7/2005 | Schulz | B60R 22/28 | 297/471 X |
| 7,137,648 B2 * | 11/2006 | Schulz | B60R 22/28 | 297/471 X |
| 8,157,067 B2 * | 4/2012 | Ruthinowski | B60N 2/2809 | 297/471 X |
| 8,641,096 B1 * | 2/2014 | Kohlndorfer | B60R 22/28 | 297/471 X |
| 9,022,483 B2 * | 5/2015 | Merrick | B60R 22/18 | 297/468 X |
| 9,809,193 B2 * | 11/2017 | Marriott | B60R 22/203 | |
| 9,821,759 B2 * | 11/2017 | Farooq | B60R 22/28 | |
| 9,827,947 B2 * | 11/2017 | Jaradi | B60R 22/1952 | |
| 10,086,795 B2 * | 10/2018 | Marriott | B60R 22/48 | |
| 2011/0133439 A1 * | 6/2011 | Pearce | B60R 22/28 | 280/805 |
| 2013/0125355 A1 * | 5/2013 | Thorbole | A44B 11/2561 | 24/633 |

FOREIGN PATENT DOCUMENTS

| | | |
|---|---|---|
| CN | 203753075 U | 8/2014 |
| CN | 104118390 B | 10/2016 |
| KR | 100157814 B1 | 7/1998 |
| KR | 100185881 B1 | 12/1998 |

* cited by examiner

EXTENDABLE TWO-PIECE SEATBELT TONGUE

BACKGROUND

The seatbelt portion of a vehicle restraint system secures the occupant of a vehicle against harmful movement that may result from a vehicle collision. The seatbelt functions to reduce the likelihood of injury by reducing the force of occupant impacts with vehicle interior structures. In this role the seatbelt applies loads across the chest or lap of the occupant. The loads from the seatbelt may be increased by pretensioners that tighten the seatbelt upon detecting an impact occurrence or an incipient impact. Controlling or reducing these loads may reduce the risk of occupant injury during a collision.

DETAILED DESCRIPTION

Relative orientations and directions (by way of example, upper, lower, bottom, forward, rearward, front, rear, back, outboard, inboard, inward, outward, lateral, left, right) are set forth in this description not as limitations, but for the convenience of the reader in picturing at least one embodiment of the structures described. Such example orientations are from the perspective of an occupant seated in a seat, facing a dashboard. In the Figures, like numerals indicate like parts throughout the several views.

A seatbelt tongue includes a tongue plate, a latch plate, a guide pin and a first retention bump. The tongue plate includes a belt slot. The latch plate is slidably connected with the tongue plate and is translatable between a first position and a second position. The guide pin is fixed to one of the tongue plate and the latch plate. The guide pin slidably passes through a pin slot in the other of the tongue plate and the latch plate. The first retention bump in the pin slot defines a pin pocket receiving the pin in the first position.

A seatbelt system includes a seatbelt, a tongue plate, a latch plate, a guide pin, a first retention bump, and a buckle. The tongue plate has a belt slot with the seatbelt disposed therein. The latch plate is slidably connected with the tongue plate and is translatable between a first position and a second position. The guide pin is fixed to one of the tongue plate and the latch plate, and slidably passes through a pin slot in the other of the tongue plate and the latch plate. The first retention bump in the pin slot defines a pin pocket receiving the pin in the first position. The buckle selectively slidably receives the latch plate.

The pin slot may be formed in the latch plate and the pin may be fixed at a first end to a core of the tongue plate.

The latch plate and a core of the tongue plate and the pin may all be formed of steel.

A retention cap may be fixed to a second end of the pin.

Each of the latch plate and an engaging section of the core of the tongue plate may be of substantially a same width.

Two opposed retention arms may be included, extending from the latch plate and wrapping around a side of the tongue plate opposite the latch plate to define a guide slot parallel to the engaging section and in receipt of the engaging section.

The bump may be deformable by the pin responsive to a predetermined tensile load between the latch plate and the tongue plate.

The first retention bump may be on a first side of the pin slot and a second retention bump may be disposed on a second side of the pin slot opposite the first retention bump.

Each of the latch plate and an engaging section of the tongue plate may be formed of steel and may be of substantially a same width. Two opposed retention arms may be included, extending from the latch plate and wrapping around a side of the tongue plate opposite the latch plate to define a guide slot parallel to the engaging section and in receipt of the engaging section. The first retention bump may be deformable by the pin responsive to a predetermined tensile load between the latch plate and the tongue plate. There may be a second retention bump on a second side of the pin slot opposite the first retention bump.

The tongue plate may include a retention cap fixed to an end of the pin.

An example restraint system 10, as illustrated in FIGS. 1-9, may be disposed in a vehicle 12. The vehicle 12 includes a first seat 14A and a second seat 14B, each for support of an occupant 16 of the vehicle 12. The restraint system 10 includes example seatbelt systems 18A, 18B for vehicle occupant locations and may include airbags (not shown) for vehicle occupant locations. Such vehicle occupant locations may include, but are not limited to, the first seat, e.g., a driver's seat 14A and the second seat, e.g., a front passenger's seat 14B.

Figure 1:
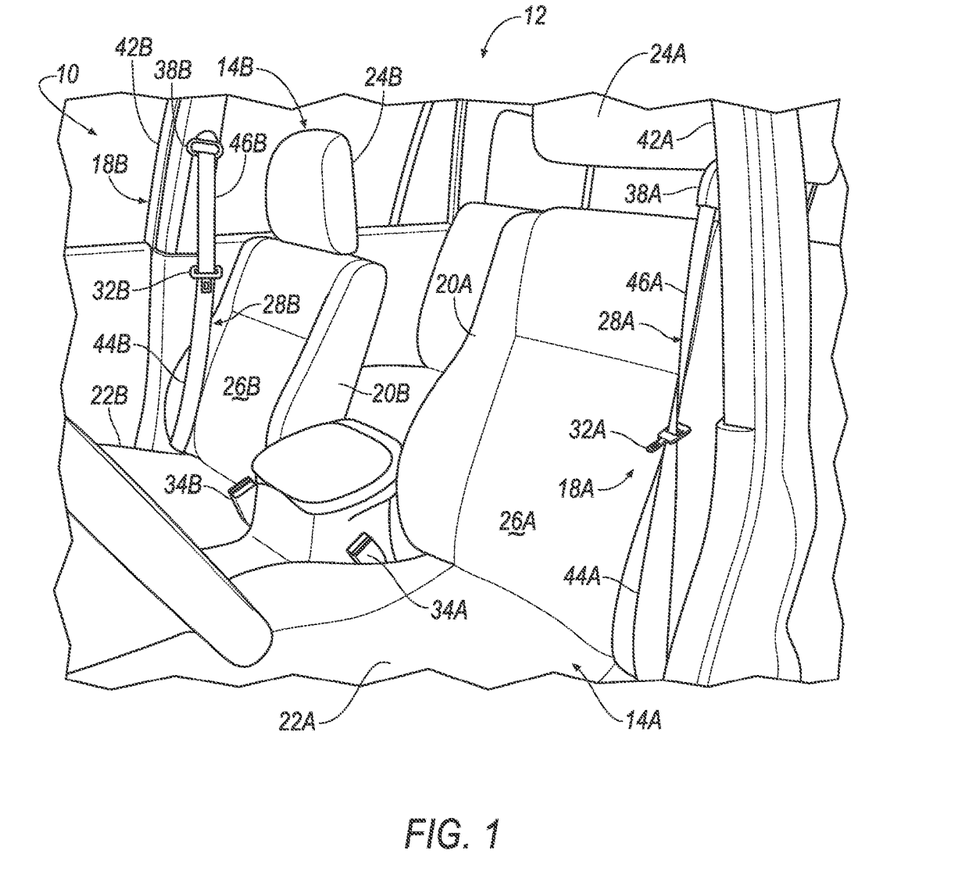
FIG. 1 is a perspective view of an interior of an example vehicle with example supplemental three-point seatbelt systems installed in the front seats.

The driver's seat 14A and the passenger's seat 14B are described herein consistent with vehicles 12 having such designated positions. The driver's seat 14A is positioned to provide access to vehicle controls such as a start switch, e.g., an ignition switch, a steering wheel, a brake pedal and an accelerator pedal. Self-driving, i.e., autonomous, vehicles may not require the provision of such controls for use by a human driver. The driver's seat 14A and the front passenger's seat 14B are shown on the left and the right side of the vehicle 12 respectively, but the positions may be reversed. In self-driving vehicles, the driver's seat 14A and passenger's seat 14B may be identical to each other, except as may be desirable to facilitate entry into and exit from vehicle 12 and seats 14A and 14B.

Figure 2:
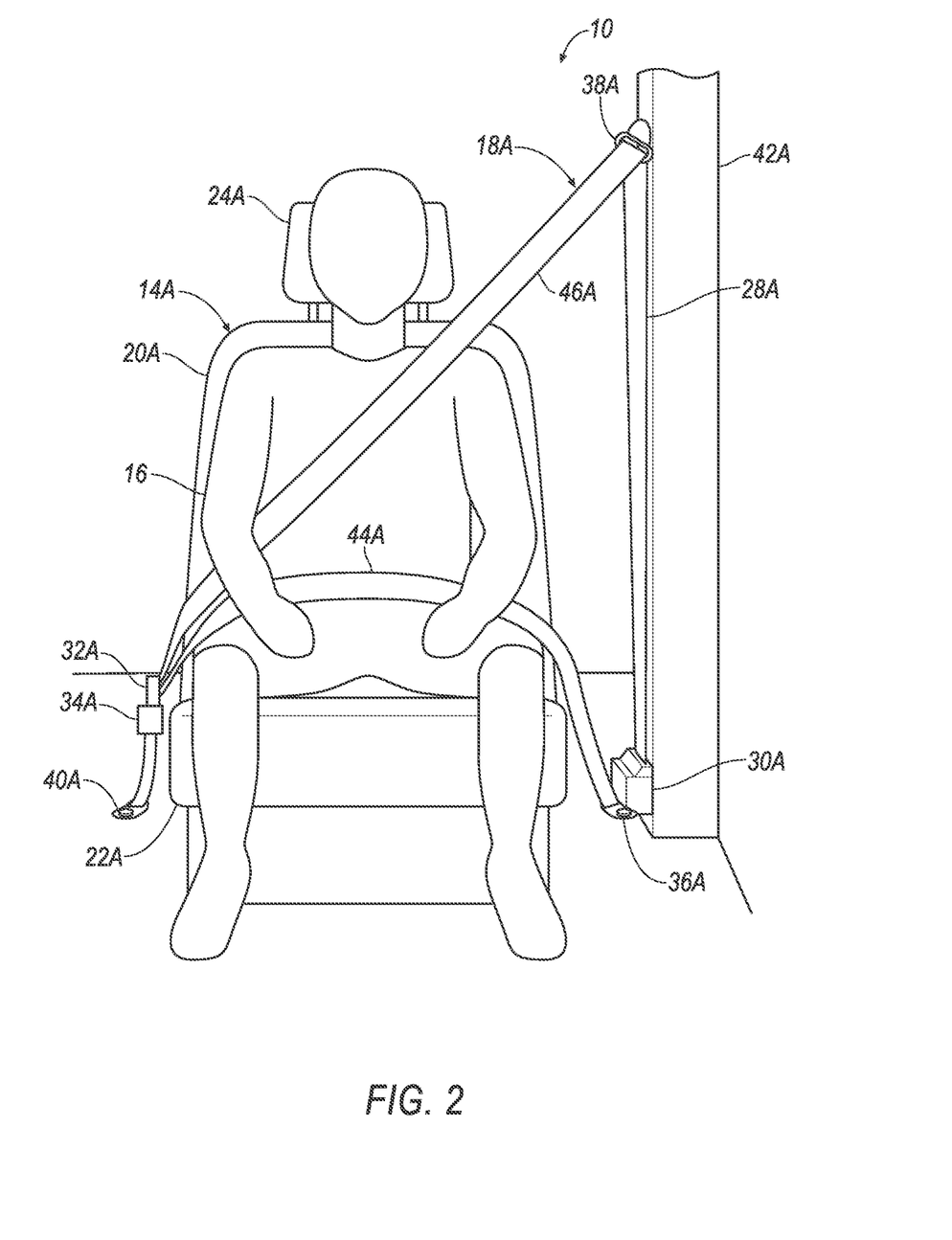
FIG. 2 is a rear-facing view of an occupied example right-hand seat with the three-point seatbelt system FIG. 1 in a fully buckled condition.

The seats 14A and 14B as shown in FIGS. 1 and 2 are bucket seats, but alternatively may be a bench seat or another type of seat or seats. The seatbelt systems 18A, 18B may be used with front seats 14A, 14B and rear seats, and with seats in any cross-vehicle position. The seats 14A, 14B may be a mirror image of each other, and may be otherwise identical. The following description will be of the driver's seat 14A and seatbelt system 18A with reference numerals followed by a suffix A. The components of the passenger's seat 14B and seatbelt system 18B are identified with the same reference numerals with a suffix B instead of a suffix A. Components labeled with the suffix B are consistent with the description of components labeled with the suffix A. The use of a reference number without a letter A or B suffix identifies such component generically, independent of location and is inclusive of components in the figures labeled with a suffix A or a suffix B.

Each seat 14A may respectively include a seat back 20A a seat bottom 22A, and a head restraint 24A. The head restraint 24A may be supported by the seat back 20A and may be stationary or movable relative to the seat back 20A. The seat back 20A may be supported by the seat bottom 22A and may be stationary or movable relative to the seat bottom 22A. The seat back 20A, the seat bottom 22A, and/or the head restraint 24A may be adjustable in multiple degrees of freedom. The seat back 20A, the seat bottom 22A, and/or the head restraint 24A may themselves be adjustable, in other words, adjustable components within the seat back 20A, the seat bottom 22A, and/or the head restraint 24A, and/or may be adjustable relative to each other.

The seat bottom 22A and/or the seat back 20A may include a seat frame (not shown) and a cushion covering 26A supported on the frame. The frame may include tubes, beams, etc. The frame may be formed of any suitable plastic material, e.g., carbon fiber reinforced plastic (CFRP), glass fiber-reinforced semi-finished thermoplastic composite (organosheet), etc. As another example, some or all components of the frame may be formed of a suitable metal, e.g., steel, aluminum, etc.

The cushion covering 26A may include upholstery and padding. The upholstery may be formed of cloth, leather, faux leather, or any other suitable material. The upholstery may be stitched in panels around the frame. The padding may be between the upholstery and the frame, and may be formed of foam or any other suitable supportive material.

The illustrated seatbelt system 18A is a three-point system. By three-point, it is meant that a seatbelt, i.e., a webbing or a belt, 28A of the system 18A restrains the occupant 16 at three points. The three points may be: at a shoulder, in the example of FIG. 2 the left shoulder, as by a seatbelt retractor 30A, and on both sides of the occupant's lap, as by a seatbelt tongue 32A, i.e., a clip, in engagement with a seatbelt buckle 34A on an inboard side, and a seatbelt anchor 36A on an outboard side. A shoulder D-ring 38A may be disposed at the shoulder between the retractor 30A and the seat back 20A. The anchor 36A may include an anchor plate fixed, as illustrated, to the vehicle structure, or alternatively, to the seat frame. The buckle 34A may be fixed to the vehicle structure or the seat frame by a buckle mount 40A.

The seatbelt anchor 36A may attach one end of the seatbelt 28A to one of the seat frame and the vehicle structure. The other end of the seatbelt 28A feeds into the retractor 30A, which may include a spool that extends and retracts the seatbelt 28A. The retractor 30A may be fixed, as illustrated, to the vehicle structure, e.g., the floor, or a B-pillar 42, or alternatively, to the seat frame. The seatbelt tongue 32A slides freely along the seatbelt 28A and, when engaged with the buckle 34A, divides the seatbelt 28A into a lap band 44A and a shoulder band 46A. The lap band 44A is disposed between the seatbelt tongue 32A and the anchor 36A. The shoulder band 46A may be disposed between the seatbelt tongue 32A and the shoulder D-ring 38A.

The seatbelt system 18A, when fastened, retains the occupant 16 in the seat 14A, e.g., during sudden decelerations of the vehicle 12.

The shoulder D-ring 38A provides a consistent orientation of the seatbelt 28A across the occupant's shoulder, e.g., in a back of the seat 14A. The shoulder D-ring 38A, when included, receives the seatbelt 28A and directs the seatbelt 28A from the retractor 30A across the shoulder of the occupant 16. The shoulder D-ring 38A may be fixed to the seat back 20A, or, alternatively, to a structural component of the vehicle, e.g. a B pillar 42A. When the retractor 30A is mounted to one of the B pillar 42A and the seat frame, the shoulder D-ring 38A may be omitted from the system 18A.

With reference to the FIGS. 3-8, the example seatbelt tongues 32A, 32B, may be identified generically as a seatbelt tongue 32. The seatbelt tongue 32 includes a tongue plate 48 slidably connected to a latch plate 50 for relative slidable movement, i.e., translation, of the tongue plate 48 between a first position shown in FIG. 7 and a second position shown in FIG. 8. A guide pin 52 may be fixed at its first end 53 to the tongue plate 48, and may slidably pass through a pin slot 54 in the latch plate 50 to allow such a slidable connection. A first retention bump 56 is disposed in the pin slot 54 to axially fix, i.e., resist sliding of, the tongue plate 48 relative to the latch plate 50 in a direction of the slot 54. The pin slot 54 is parallel to sides of the latch plate 50. In an alternative embodiment, not shown, the guide pin 52 may be fixed to the latch plate 50 and the slot 54 disposed in the tongue plate 48.

Figure 3:
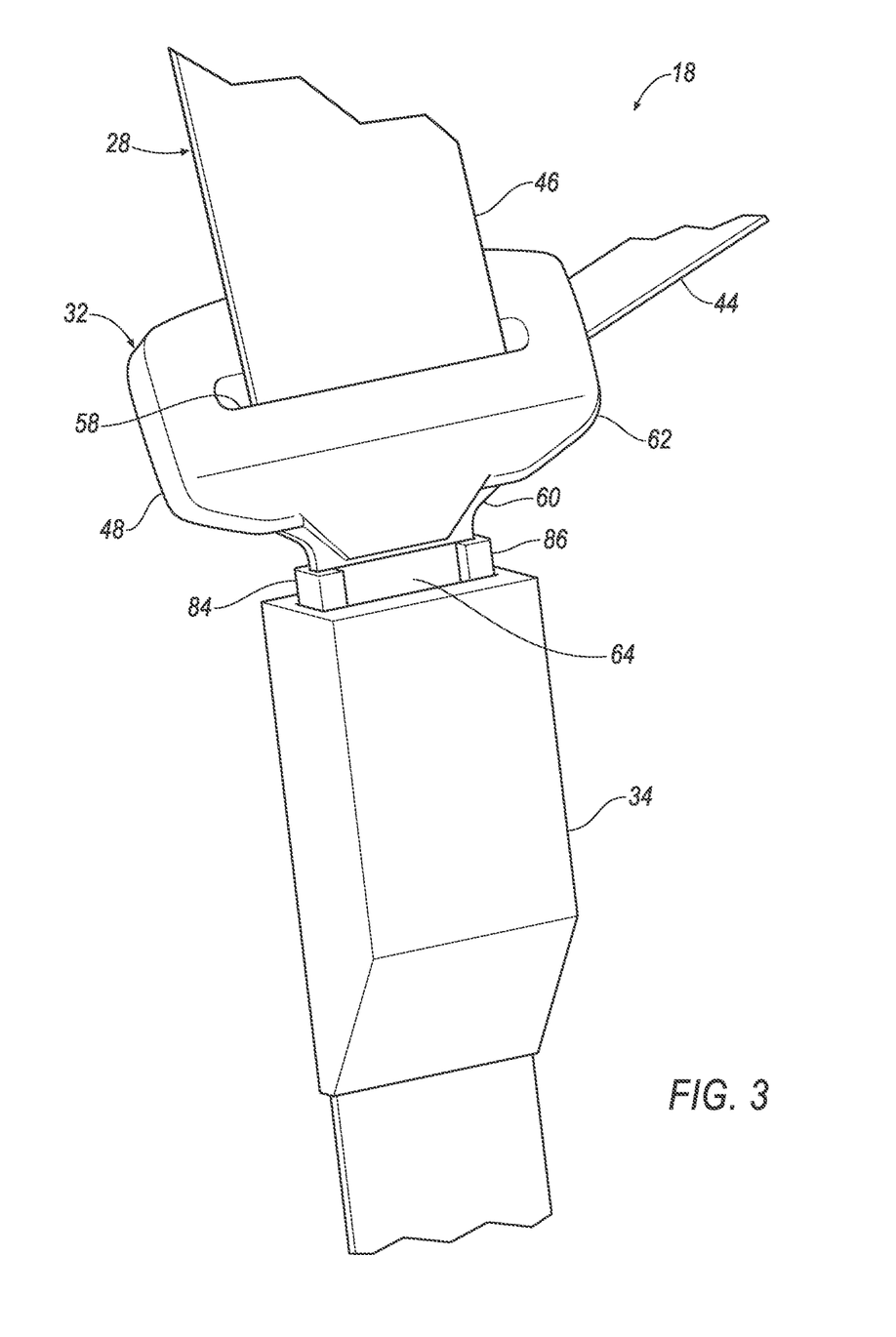
FIG. 3 is an enlarged perspective view of an example seatbelt tongue in engagement with a buckle.
Figure 4:
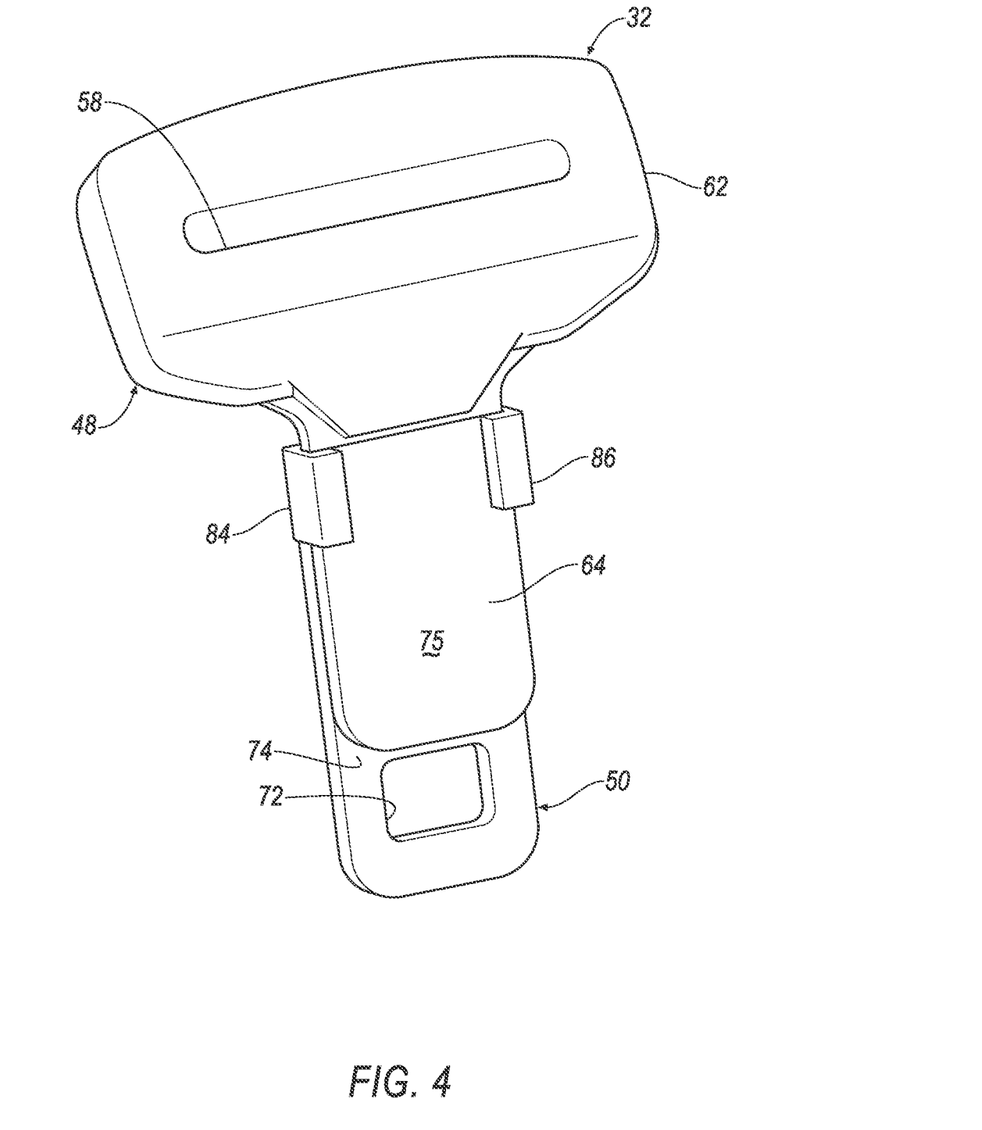
FIG. 4 is a perspective view of a first side of the seatbelt tongue of FIG. 3.
Figure 5:
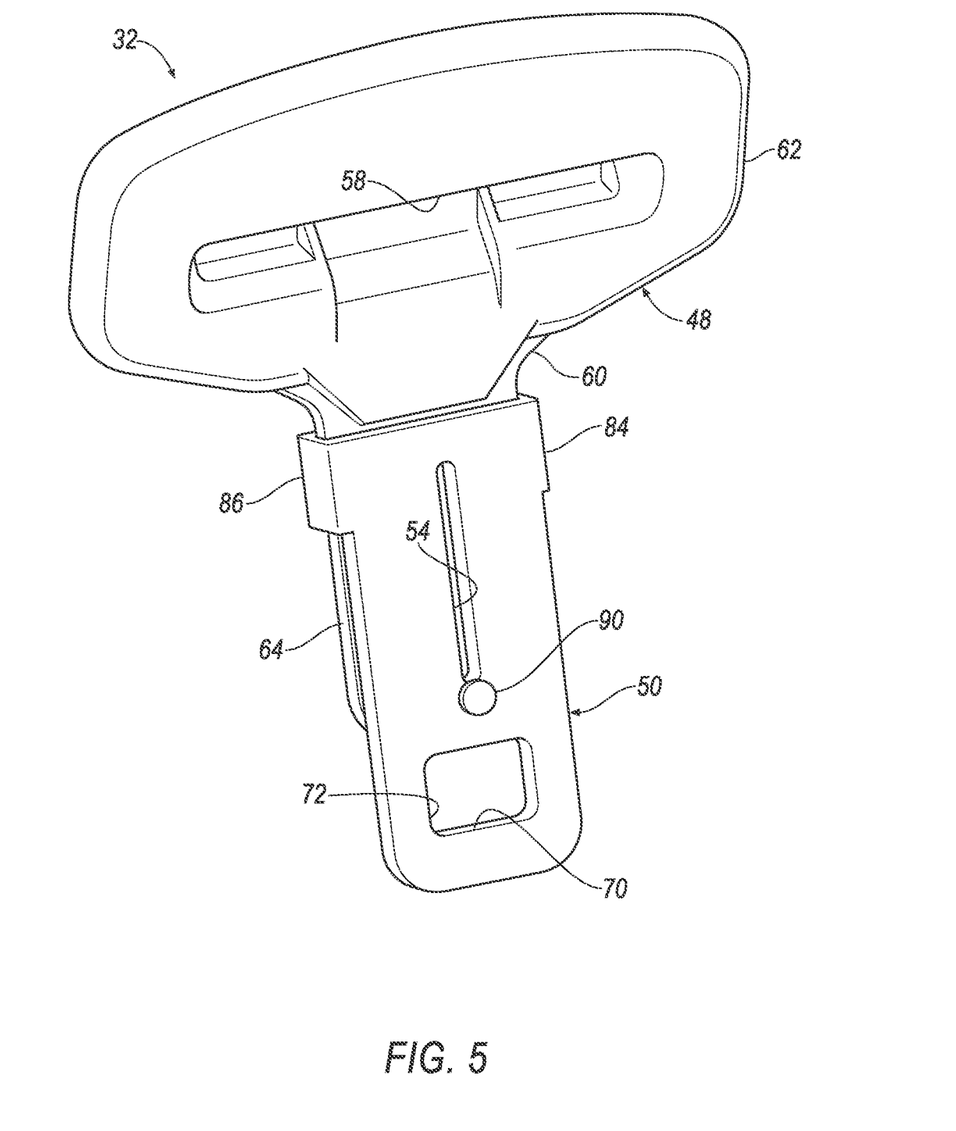
FIG. 5 is a perspective view of a second side of the seatbelt tongue of FIG. 3.

The tongue plate 48 slidably receives the seatbelt 28 through its belt slot 58. The tongue plate 48 divides the seatbelt 28 into the lap band 44 and the shoulder band 46 as illustrated in FIG. 3.

Figure 6:
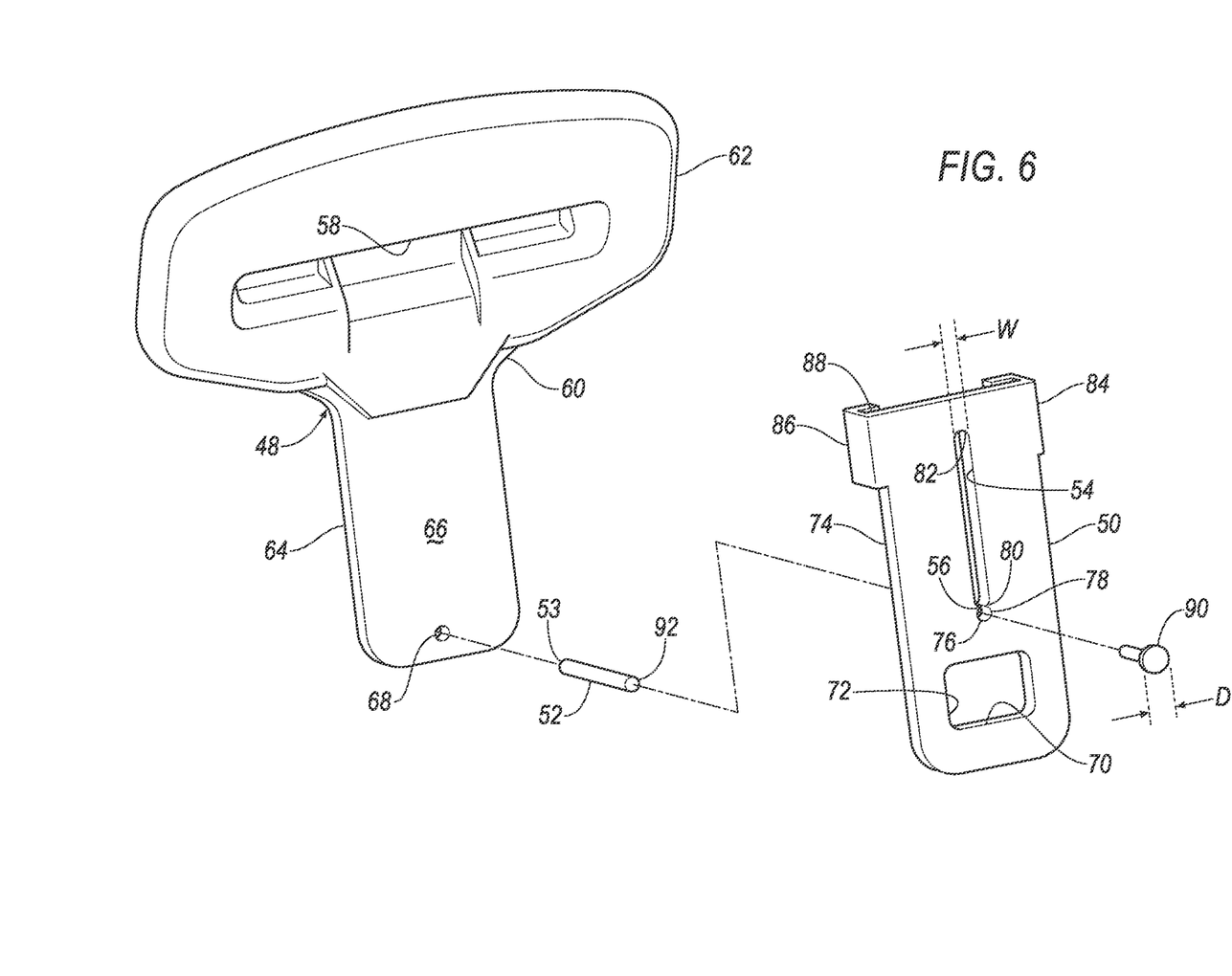
FIG. 6 is an exploded view of the seatbelt tongue of FIG. 3.

The tongue plate 48 may include a core 60 formed of steel. A plastic cap 62 may be disposed over and fixed to a portion of the core 60 that includes the belt slot 58 and may exclude an engaging section 64 of the tongue plate 48. As shown in FIG. 6, the tongue plate 48 may have a first coupling area 66 on the engaging section 64. The coupling area 66 may have a pin aperture 68 for receiving the guide pin 52.

The latch plate 50 has a latch engagement surface 70 as may be provided by a latching aperture 72. The latch engagement surface 70 is operably engaged by a buckle latch (not shown) disposed within the buckle 34. Alternatively, the latch engagement surface 70 may be a raised surface (not shown) on the latch plate 50. The latch plate 50 includes a second coupling area 74 that may further have the pin slot 54 for receiving the guide pin 52. The latch plate 50 and the engaging section 64 may be of substantially a common, e.g., the same, width. The latch plate 50 may be formed of steel.

The first coupling area 66 of the tongue plate 48 and the second coupling area 74 of the latch plate 50 overlap each other, and may both be smooth and flat. When the coupling areas 66, 74 are disposed against each other, the tongue plate 48 and the latch plate 50 are able to slide relative to each other with no or minimal interference with each other.

The guide pin 52 may be a separate, discrete pin, in the form of a rivet or a threaded fastener. The guide pin 52 may be received by the pin aperture 68 to allow the pin 52 to remain fixed to the engaging section 64, e.g., press fit, with an outside diameter of the pin 52 being larger than an inside diameter of the aperture 68; threaded, with threads disposed on the pin 52 and inside the aperture 68; or riveted, i.e., peened, with a smaller diameter portion at an end defining a shoulder on a first end of the pin 52, the smaller diameter portion passing through the aperture 68 and a portion of the pin extending beyond a side of the engaging section 64 opposite the second coupling area 74 being peened to form a rivet head. To allow the seatbelt tongue 32 to easily enter the buckle 34, the first end 53 may be flush with or beneath a first surface 75 of the tongue plate 48. The first surface 75 is opposite the first coupling area 66. The guide pin 52 may be formed of steel.

The example first retention bump 56 may include a section formed integral with the latch plate 50 and extending into the slot 54. The bump 56 may be C-shaped. The retention bump 56 defines a pin pocket 76 in which the pin 52 may be trapped. The pin pocket 76 may be at a first end 78 of the slot 54, proximate to the latching aperture 72. A second retention bump 80, directly opposed from bump 56 across the slot 54, may also be provided to cooperatively define the pin pocket 76. The bumps 56, 80 are shaped to allow the pin 52 to push therepast when a predetermined tensile load, e.g., 3000 pounds, is imposed on the seatbelt tongue 32. Bump shape parameters may include a width, i.e., how far the bumps 56, 80 extend into the slot; a length, i.e., how much of a length of the slot 54 that the bumps 56, 80 occupy; a thickness of the bumps; and material characteristics of the bumps, e.g., heat treating of the bumps.

The pin 52 may be slightly compromised, e.g., have its cross-sectional area reduced when it moves past the bumps 56, 80, but it remains sufficiently intact to engage a second end 82 of the slot 54 to limit the travel of the tongue plate 48 relative to the latch plate 50. The strength of the interface between the pin 52 and the bump 56, 80 equals the predetermined tensile load that establishes a magnitude of axial resistance to relative displacement between the tongue plate 48 and the latch plate 50 in the direction of the slot 54.

Two opposed retention arms 84, 86 may each extend from the latch plate 50 and wrap around to at least partially cover the first surface 75 of the tongue plate 48, opposite the latch plate 50. The arms 84, 86 define a guide slot 88 parallel to the engaging section 64 of the core 60 and in receipt of the engaging section 64. The arms 84, 86 maintain the latch plate 50 in alignment with the engaging section 64, allowing a relative sliding relationship therebetween. The arms 84, 86 may be formed of steel, and may be formed integrally with the latch plate 50. The arms 84, 86 may alternatively be formed separately from the latch plate 50 and fixed thereto by, for example, welding.

Figure 7:
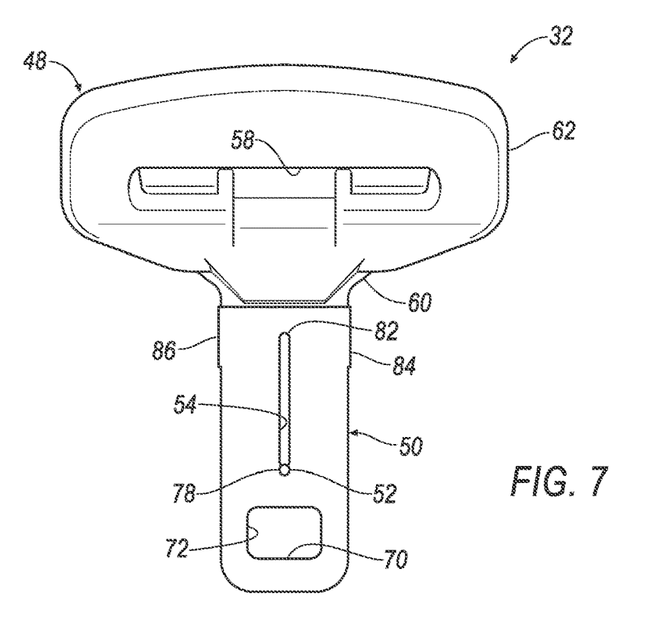
FIG. 7 is a rear view of the seatbelt tongue of FIG. 3 with a latch plate in a first condition.
Figure 8:
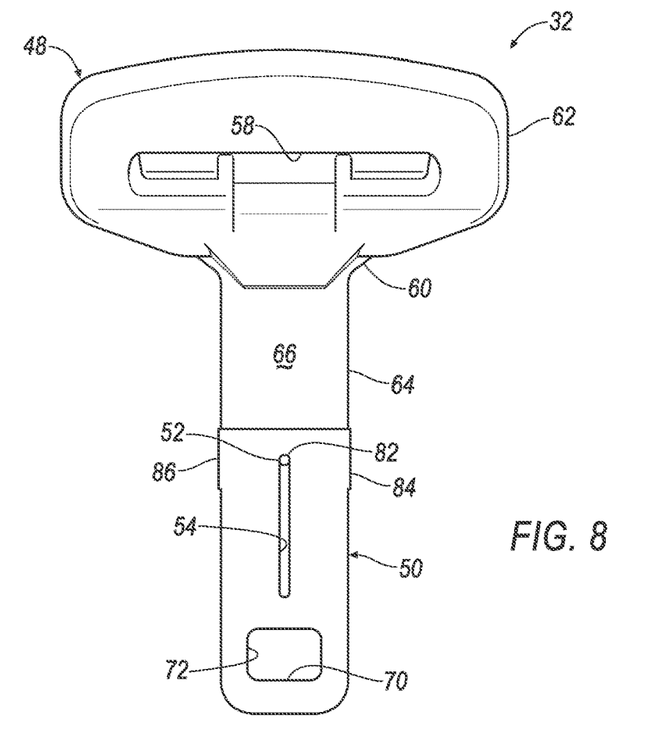
FIG. 8 is a rear view of the seatbelt tongue of FIG. 7 in a second, extended, condition.

A retention cap 90 may be disposed over a second end 92 of the pin 52, opposite the first end 53. The cap 90 includes an outside diameter D greater than a width W of the slot. The outside diameter D may be defined by an outer wall of the cap 90 by a flange of the cap 90. The cap 90 may be fixed to the pin 52 to resist movement of the first and second coupling areas 66, 74 away from each other as may be achieved, by way of example, threading, interference fit, adhesive bonding, and so on. The cap 90 may be formed of steel or plastic. FIGS. 7 and 8 show the pin 52 without the retention cap 90 for illustration purposes.

In operation, the seatbelt 28 is placed across the occupant 16, engaging the seatbelt tongue 32 with the buckle 34. In the event of an impact, e.g., a frontal impact, the occupant 16 of the seat 14 has forward momentum relative to the rest of the vehicle 12. The forward inertial motion of the occupant 16, and particularly of the torso of the occupant 16, may act against the seatbelt 28. With a waist area of the occupant 16 engaging the lap band 44 and the upper torso of the occupant 16 engaging the shoulder band 46, the seatbelt 28 is placed in tension. An inertial force of the occupant 16 against the shoulder band 46 may result in deflection of the occupant's chest.

With a one-piece seatbelt tongue, i.e., one in which the tongue plate 48 and the latch plate 50 are unitary and integral and do not permit relative movement, the shoulder band 46 has been observed to compress the chest of the occupants. Such a load path may result in a first magnitude of loading from the shoulder band 46 against the chest.

A slidably extendable two-piece seatbelt tongue 32 allows the tongue plate 48 to slide relative to the latch plate 50 when the load on the tongue plate 48 exceeds the predetermined tensile load. The bumps 56, 80 are configured to prevent relative sliding of the unloaded tongue plate 48 and latch plate 50, maintaining the latch plate 50 and the tongue plate 48 of the seatbelt tongue 32 in the orientation of FIG. 7. It is only when a tension in the seatbelt 28 exceeds the predetermined tensile load, e.g., 3000 pounds, resulting in a corresponding axial force between the tongue plate 48 and the latch plate 50 exceeding the predetermined axial force, that the bumps 56, 80 deform, e.g., bend, fracture, to allow the pin 52 to move therepast and sliding between the tongue plate 48 and the latch plate 50 to occur. The deformation of bumps 56, 80 may include their entire elimination as illustrated in FIG. 8, and may also include any amount of deformation sufficient to allow the pin 52 to move to the second end 82 of the slot 54. With such bump deformation, and the associated relative translation of the latch plate 50 and the tongue plate 48, the tension in the shoulder band 46 and the load of the shoulder band 46 across the chest decreases.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seatbelt tongue comprising:
   a tongue plate having a belt slot;
   a latch plate slidably connected with the tongue plate and translatable between a first position and a second position;
   a guide pin fixed to one of the tongue plate and the latch plate and slidably passing through a pin slot in the other; and
   a first retention bump in the pin slot defining a pin pocket receiving the pin in the first position;
   wherein the pin slot is formed in the latch plate and the pin is fixed at a first end to a core of the tongue plate.

2. The seatbelt tongue of claim 1, wherein the latch plate and the core of the tongue plate and the pin are all formed of steel.

3. The seatbelt tongue of claim 2, further comprising a retention cap fixed to a second end of the pin.

4. The seatbelt tongue of claim 2, wherein each of the latch plate and an engaging section of the core of the tongue plate are of substantially a same width.

5. The seatbelt tongue of claim 4, further comprising two opposed retention arms extending from the latch plate and wrapping around a side of the tongue plate opposite the latch plate to define a guide slot parallel to the engaging section and in receipt of the engaging section.

6. The seatbelt tongue of claim 1, wherein the bump is deformable by the pin responsive to a predetermined tensile load between the latch plate and the tongue plate.

7. The seatbelt tongue of claim 6, wherein the first retention bump is on a first side of the pin slot and a second retention bump is disposed on a second side of the pin slot opposite the first retention bump.

8. The seatbelt tongue of claim 1:
wherein each of the latch plate and an engaging section of the tongue plate are formed of steel and are of substantially a same width;
further comprising two opposed retention arms extending from the latch plate and wrapping around a side of the tongue plate opposite the latch plate to define a guide slot parallel to the engaging section and in receipt of the engaging section;
wherein the first retention bump is on a first side of the pin slot and is deformable by the pin responsive to a predetermined tensile load between the latch plate and the tongue plate; and
wherein a second retention bump is on a second side of the pin slot opposite the first retention bump.

9. The seatbelt tongue of claim 8, further comprising a retention cap fixed to a second end of the pin.

10. A seatbelt system comprising:
a seatbelt;
a tongue plate having a belt slot with the seatbelt disposed therein;
a latch plate slidably connected with the tongue plate and translatable between a first position and a second position;
a guide pin fixed to one of the tongue plate and the latch plate and slidably passing through a pin slot in the other;
a first retention bump in the pin slot defining a pin pocket receiving the pin in the first position; and
a buckle selectively slidably receiving the latch plate;
wherein the pin slot is formed in the latch plate and the pin is fixed at a first end to the core of the tongue plate.

11. The system of claim 10, wherein the latch plate and the core of the tongue plate and the pin are all formed of steel.

12. The system of claim 11, further comprising a retention cap fixed to a second end of the pin.

13. The system of claim 11, wherein each of the latch plate and an engaging section of the core of the tongue plate are of substantially a same width.

14. The system of claim 13, further comprising two opposed retention arms extending from the latch plate and wrapping around a side of the tongue plate opposite the latch plate to define a guide slot parallel to the engaging section and in receipt of the engaging section.

15. The system of claim 10, wherein the first retention bump is deformable by the pin responsive to the predetermined tensile load between the latch plate and the tongue plate.

16. The system of claim 15, wherein there is a second retention bump on a second side of the pin slot opposite the first retention bump.

17. The system of claim 10:
wherein each of the latch plate and an engaging section of the tongue plate are formed of steel and are of substantially a same width;
further comprising two opposed retention arms extending from the latch plate and wrapping around a side of the tongue plate opposite the latch plate to define a guide slot parallel to the engaging section and in receipt of the engaging section;
wherein the first retention bump is on a first side of the pin slot and is deformable by the pin responsive to a predetermined tensile load between the latch plate and the tongue plate; and
wherein a second retention bump is on a second side of the pin slot opposite the first retention bump.

18. The system of claim 17, further comprising a retention cap fixed to a second end of the pin.

* * * * *